: 2,913,370
Patented Nov. 17, 1959

2,913,370
METHOD OF INHIBITING GROWTH OF PLANT VIRUSES

Van R. Gaertner and George A. Richardson, Dayton, Ohio, assignors to Monsanto Chemical Company, St. Louis, Mo., a corporation of Delaware No Drawing. Application June 2, 1958
Serial No. 738,921

9 Claims. (Cl. 167—30)

This invention relates to a novel method of inhibiting the growth of plant viruses. More particularly the invention relates to the use of N-(dithiocarboxy)amino acids and derivatives thereof as viricides.

It is well known that plant viruses are a serious economic problem in the cultivation of many crops. Thus virus infection of a crop may result in from a decreased yield and quality of the agricultural product to the actual abandonment of certain areas for the cultivation of crops. For example, the virus diseases are a serious problem in the farming of tobacco, tomato, bean, cabbage, broccoli, potato, sugar beet, sugar cane, strawberry, raspberry, hops, peach, orange, cocoa, many flowers, etc. Thus, it has been estimated that tobacco mosaic virus causes an annual loss of 40 million pounds of tobacco in the United States alone.

It is an object of the present invention to provide a chemical method of treating plants to inhibit the growth of viruses in plants. Another object of the present invention is to provide a chemical method of treating tobacco plants to inhibit the growth of tobacco mosaic virus therein. Other objects of the present invention will be apparent to those skilled in the art from the following disclosure.

It has now been found that the N-(S-aryldithiocarboxy)-amino acids are effective in inhibiting the growth of plant viruses and are particularly useful in the treatment of tobacco crops to inhibit the growth of tobacco mosaic virus therein. The preferred viricide compositions can be shown by the illustrative structural formula

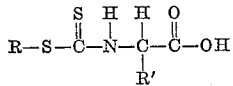

wherein R is an aryl radical and R' is the remaining structure of an α-amino acid as hereinafter more fully exemplified. Preferably the aryl radical contains less than about 15 carbon atoms, and more preferably still does not exceed about 10 carbon atoms.

Various derivatives of the N-(S-aryldithiocarboxy)-amino acids may also be employed in whole or in part for the acid, for example, various salts thereof, preferably the alkali metal and alkaline earth metal salts, i.e. sodium, potassium, magnesium, calcium, and the like; various esters thereof, preferably wherein the alcohol moiety of said ester contains up to about 12 carbon atoms, and more preferably still up to about 8 carbon atoms, i.e. methyl, ethyl, propyl, butyl, hexyl, 2-ethylhexyl, decyl, dodecyl, phenyl, benzyl, and the like esters; and amides, which may also contain N-hydrocarbyl substituents therein preferably containing less than about 8 carbon atoms.

The N-(S-aryldithiocarboxy)amino acids, which are useful as viricides in the present invention, can be prepared by reacting an aryl ester of a halodithioformic acid with an α-amino acid in which the carboxyl group has been blocked by previous esterification. For example, N-(S-phenyldithiocarboxy)alanine can be prepared by reacting phenyl dithiochloroformate with the ethyl ester of alanine, after which the ethyl group is removed by hydrolysis in aqueous acidic solution. This method is applicable generally to all the α-amino acids, typical of which are alanine, α-aminoisobutyric acid, valine, leucine, norleucine, isoleucine, phenylalanine, tyrosine, threonine, serine, proline, hydroxyproline, tryptophane, thyroxine, iodogorgoic acid, methionine, cystine, cysteine, lysine, arginine, histidine, aspartic acid, glutamic acid, β-hydroxyglutamic acid, ornithine, and many others. With the more complicated α-amino acids (i.e., ones containing functional or reactive groups in addition to the first carboxyl group and its α-amino group) it will often be necessary to block or protect the additional functional groups in order to keep them from interfering with the desired reactions. For example, hydroxyl or mercapto groups can be readily protected with carbobenzyloxy or benzyl groups. Other protecting groups and techniques for blocking reactive groups are well known in connection with reactions involving amino acid and peptide chemistry, and are generally applicable to the present invention in ways which will be obvious to those skilled in the art.

Typical aryl halodithioformates for reaction with the above-discussed amino acids are phenyl chlorodithioformate, phenyl bromodithioformate, 2,4-dichlorophenyl chlorodithioformate, α-naphthyl chlorodithioformate, m-tolyl chlorodithioformate, m-tolyl iododithioformate, 2,4-dimethylphenyl chlorodithioformate, 3-ethylphenyl chlorodithioformate, p-(p'-methoxybiphenyl) chlorodithioformate, 2-methtyl-4-nitrophenyl chlorodithioformate, as well as many others. The term "aryl" as used in connection with the preceding aryl esters of halodithioformic acids includes only those compounds having an aromatic nucleus attached directly to the thiol sulfur atom of the dithioformic acid. However, certain of the unsaturated heterocyclic compounds (e.g., thiophene, furan, pyridine, etc.) which have aromatic-type resonating structures similar to benzene can be substituted for the aromatic groups mentioned above.

The N-(S-aryldithiocarboxy)amino acids can be applied to the plants to be treated by methods known to those skilled in the art. One preferred means of applying the viricide is by spraying the plant foliage with an aqueous suspension thereof, wherein the viricide is present in a sufficient concentration to provide effective inhibition of the plant virus. The preferred suitable concentrations generally range from about $10^{-3}$ to about $10^{-5}$ molar compositions, but more concentrated formulations can be employed as desired. Various emulsifying agents can be employed to prepare the aqueous suspension, e.g. sodium alkylbenzene-sulfonates, polyalkylene glycols, alkali metal salts of sulfated long-chain alcohols, sorbitan fatty acid esters, etc. Mixed emulsifying agents have also been shown to be suitable, for example a mixture of an alkylphenol ethylene oxide adduct with an alkyl aryl sulfonate, etc. Other emulsifying agents which can be employed are disclosed in U.S. Department of Agriculture Bulletin No. E607.

The viricide can also be applied in the case of potted plants by dipping the plant in an aqueous suspension thereof. The viricide can also be applied by dusting the plant therewith, preferably by providing a mixture of the finely divided viricide and an inert pulverulent carrier, as for example, talc, bentonite, kieselguhr, diatomaceous earth, and the like. The viricide can also be applied as a solution or dispersion in an organic solvent system which is relatively non-phytotoxic to the particular plant being treated, for example dioxane, anisole, tetrahydrofuran, etc.

Mixtures of the N-(S-aryldithiocarboxy)amino acids can be employed to treat the plants and other viricidal compositions may be included in the formulations as desired. Also the viricides can be employed with compatible insecticide compositions and the like.

The following examples are illustrative of the instant invention.

*Example 1*

A mixture of 40 grams of L-phenylalanine and 400 ml. of absolute ethanol was placed in a one-liter flask into which hydrogen chloride gas was passed until a clear solution was formed and had become saturated with hydrogen chloride. The excess alcohol and hydrogen chloride was evaporated under reduced pressure, leaving a mushy, syrupy, solid-like residue. The solid was redissolved in 400 ml. of absolute ethanol and again saturated with hydrogen chloride gas. The excess alcohol and hydrogen chloride was again removed by evaporation. The resulting solid was dissolved in 300 ml. of alcohol, reprecipitated by very slow addition of a large excess of ether, and stored overnight at −50° C. This crude material was washed with ether and dried to give a 77% yield of phenylalanine ethyl ester hydrochloride, melting at 153–154° C.

Forty grams of the foregoing phenylalanine ethyl ester hydrochloride, 150 ml. of chloroform and 18 ml. of diethylamine were mixed together in a one-liter flask and shaken in an ice-bath until the solution has become clear. Ether (450 ml.) was added to precipitate the diethylamine hydrochloride, which was filtered and washed with additional ether. The filtrate was dried in vacuo and then dissolved in 110 ml. of chloroform, to which there was added dropwise a solution of 16.5 grams of phenyl chlorodithioformate in 30 ml. of chloroform. About half-way through the addition, it was necessary to add another 140 ml. of chloroform in order to fluidize the resulting reaction mixture. The resulting reaction mixture was washed with three 80-ml. portions of 2N hydrochloric acid and three 80-ml. portions of water. Chloroform was removed from the mixture under vacuum at 45–50° C. to give an 81% yield of crude product as a deep yellow solid, soluble in benzene, ethyl acetate, chloroform and acetone, but insoluble in water. The crude product was recrystallized from methanol to give the ethyl ester of N-(S-phenyldithiocarboxy)phenylalanine, melting at 105–107° C. Analysis, calculated for $C_{18}H_{19}NO_2S_2$: C, 62.58%; H, 5.54%; N, 4.05%; S, 18.56%; found: C, 62.92%; H, 5.96%; N, 4.54%; S, 18.52%.

Twenty grams of the foregoing ethyl ester of N-(S-phenyldithiocarboxy)phenylalanine was refluxed in 570 ml. of an equal volume mixture of glacial acetic acid and concentrated hydrochloric acid for about 2 hours until a clear, yellow solution had formed. This solution was cooled and added to 1.5 liters of cold water from which a red syrup settled out and crystallized after standing for about 2 days. This crude crystalline product was purified by repeatedly dissolving in boiling benzene and recrystallizing by cautious addition of hexane. The purified product, N-(S-phenyldithiocarboxy)phenylalanine, was a pure white, needle-like, crystalline solid melting 116–117.5° C. Analysis, calculated for $C_{16}H_{15}NO_2S_2$: N, 4.41%; S, 20.20%; found: N, 4.68; S, 19.18%.

*Example 2*

A healthy tobacco leaf (*Nicotiana xanthium*) was inoculated with tobacco mosaic virus by rubbing the leaf with a gauze pad soaked with a phosphate buffered (pH of 7.3) solution containing 200 micrograms of the virus per milliliter. The inoculated leaf was incubated under an inverted glass beaker with its petiole in water for approximately 24 hours). Twelve circular disks of equal size (approximately 1 centimeter diameter) were then cut from the leaf tissue and rinsed with sterile distilled water. Six disks were placed in each of two sterile Petri dishes each containing 15 milliliters of half-strength Vickery's solution. One of the solutions also contained a $10^{-5}$ M concentration of N(S - phenyldithiocarboxy)-phenylalanine. The leaf disks were left in these solutions under artificial light (fluorescent "daylight" lamps) at 70° F.±2° for one week, after which the disks were homogenized and centrifuged to recover the virus therefrom according to standard laboratory techniques. The amount of virus recovered from each set of disks was determined by optical density measurements of solutions containing such virus. In this way it was found that $10^{-5}$ M concentration of N-(S-phenyldithiocarboxy)-phenylalanine caused a 72% (average of two replications) inhibition of virus synthesis. The same procedure carried out with the N-(S-phenyldithiocarboxy)phenylalanine present at a concentration of $5 \times 10^{-5}$ M, resulted in 81% inhibition.

*Example 3*

The compound N-(S-phenyldithiocarboxy)phenylalanine was also evaluated on whole tobacco plants (*Nicotiana glutinosa*) which had been infected with tobacco mosaic virus and the decrease in local lesions observed on the treated plants as compared to control plants.

The tobacco plants of the same size and age were divided into groups. The smaller and older leaves were removed from all plants leaving only the leaves of approximately equal size. These leaves were dusted lightly with Carborundum, then the leaves were inoculated by painting them lightly with a solution of tobacco mosaic virus. One hour later one-half of the plants were treated with a $10^{-4}$ molar concentration of N-(S-phenyldithiocarboxy)phenylalanine. The plants were then observed over a period of 3 to 6 days during which time numerous local lesions appeared on the inoculated leaves of the control plants. It was observed that the treated plants had significantly fewer lesions than the control plants, the test compound effecting an inhibition of about 20%.

*Example 4*

In a similar manner to Example 3, N-(S-phenyldithiocarboxy)glycine was evaluated by the leaf disk procedure to determine its effectiveness on *Nicotiana xanthium* against tobacco mosaic virus. It was found that a $5 \times 10^{-4}$ molar concentration of the test compound effected a 98% inhibition.

Other illustrative N-(S-aryldithiocarboxy)amino acids which are effective viricides are: N-(S-phenyldithiocarboxy)alanine, N-(S-phenyldithiocarboxy)leucine, α-[N-(S-phenyldithiocarboxy)amino]isobutyric acid, N-[S-2-4-dichlorophenyl)dithiocarboxy]valine, N-[S-(α-naphthyl)dithiocarboxy]phenylalanine, N-[S-m-tolyl)dithiocarboxy]proline, $N^{\epsilon}$ - (S - phenyldithiocarboxy) tryptophane, $N^{\alpha}$ - [S - (2,4 - dimethylphenyl)dithiocarboxy]-lysine, N - [S - (2 - methyl - 4 - nitrophenyl)dithiocarboxy]phenylalanine, N-(S-phenyldithiocarboxy)glutamic acid, N-(S - phenyldithiocarboxy)serine, N - (S - phenyldithiocarboxy)sarcosine, N - (S - phenyldithiocarboxy)-tyrosine, $N^{\epsilon}$ - (S - phenyldithiocarboxy)histidine, $N^{\alpha}$-(S-phenyldithiocarboxy)lysine, $N^{\epsilon}$-(S-phenyldithiocarboxy)-lysine, and the like.

This application is a continuation-in-part of our application Serial No. 600,699, filed July 30, 1956, now U.S. Patent No. 2,850,518.

We claim:

1. The method of inhibiting the growth of plant viruses comprising contacting living plants with an effective virus-inhibiting concentration of an N-(S-aryldithiocarboxy)amino acid, wherein the aryl radical is a lower aryl radical containing less than about 15 carbon atoms and in which the amino group of the amino acid is attached to a carbon atom which is adjacent to a carbonyl group and said carbon atom is selected from the group consisting of asymmetric carbon atoms and tertiary carbon atoms.

2. The method of inhibiting the growth of tobacco mosaic virus comprising contacting tobacco plants with an effective virus-inhibiting concentration of an N-(S-aryldithiocarboxy)amino acid, wherein the aryl radical is a lower aryl radical containing less than about 15 carbon atoms and in which the amino group of the amino acid is attached to a carbon atom which is adjacent to a carbonyl group and said carbon atom is selected from the group consisting of asymmetric carbon atoms and tertiary carbon atoms.

3. The method of inhibiting the growth of tobacco mosaic virus comprising contacting tobacco plants with an effective virus-inhibiting concentration of an N-(S-aryldithiocarboxy)amino acid, selected from the group consisting of N-(S-phenyldithiocarboxy)glycine, N-(S-phenyldithiocarboxy)phenylalanine, N - (S-phenyldithiocarboxy)alanine, N-(S-phenyldithiocarboxy)serine, and $N^\alpha$-(S-phenyldithiocarboxy)lysine.

4. The method of inhibiting the growth of tobacco mosaic virus comprising contacting tobacco plants with an effective virus-inhibiting concentration of N-(S-phenyldithiocarboxy)glycine.

5. The method of inhibiting the growth of tobacco mosaic virus comprising contacting tobacco plants with an effective virus-inhibiting concentration of N-(S-phenyldithiocarboxy)phenylalanine.

6. The method of inhibiting the growth of tobacco mosaic virus comprising contacting tobacco plants with an effective virus-inhibiting concentration of N-(S-phenyldithiocarboxy)alanine.

7. The method of inhibiting the growth of tobacco mosaic virus comprising contacting tobacco plants with an effective virus-inhibiting concentration of N-(S-phenyldithiocarboxy)serine.

8. The method of inhibiting the growth of tobacco mosaic virus comprising contacting tobacco plants with an effective virus-inhibiting concentration of $N^\alpha$-(S-phenyldithiocarboxy)lysine.

9. The method of inhibiting the growth of tobacco mosaic virus, which comprises contacting tobacco plants with an effective inhibiting concentration of an α-[N-(S-aryldithiocarboxy)amino] acid in which the α-carbon atom of the amino acid moiety of the aforesaid compound is an asymmetric carbon atom and wherein the aryl radical is a lower aryl radical containing less than about 15 carbon atoms therein.

References Cited in the file of this patent

UNITED STATES PATENTS 2,751,382    Martin _____ June 19, 1956